(12) United States Patent
Hanschke et al.

(10) Patent No.: US 10,497,954 B2
(45) Date of Patent: Dec. 3, 2019

(54) METHOD FOR CONTROLLING PRESSURE

(71) Applicant: Daimler AG, Stuttgart (DE)

(72) Inventors: Jonas Hanschke, Stuttgart (DE); Sven Schmalzriedt, Esslingen (DE)

(73) Assignee: Daimler AG, Stuttgart (DE)

( * ) Notice: Subject to any disclaimer, the term of this patent is extended or adjusted under 35 U.S.C. 154(b) by 469 days.

(21) Appl. No.: 14/914,177

(22) PCT Filed: Aug. 19, 2014

(86) PCT No.: PCT/EP2014/002275
§ 371 (c)(1),
(2) Date: Feb. 24, 2016

(87) PCT Pub. No.: WO2015/028128
PCT Pub. Date: Mar. 5, 2015

(65) Prior Publication Data
US 2016/0218383 A1 Jul. 28, 2016

(30) Foreign Application Priority Data

Aug. 29, 2013 (DE) ......................... 10 2013 014 413

(51) Int. Cl.
*H01M 8/04746* (2016.01)
*H01M 8/04089* (2016.01)
(Continued)

(52) U.S. Cl.
CPC ... *H01M 8/04753* (2013.01); *H01M 8/04104* (2013.01); *H01M 8/04111* (2013.01);
(Continued)

(58) Field of Classification Search
CPC .................... H01M 8/04104; H01M 8/04111
See application file for complete search history.

(56) References Cited

U.S. PATENT DOCUMENTS 9,034,529 B2   5/2015  Mueller et al.
2003/0232231 A1  12/2003  Stute et al.
(Continued)

FOREIGN PATENT DOCUMENTS

DE         102 16 953 A1   11/2003
DE    10 2007 028 297 A1   12/2008
(Continued)

OTHER PUBLICATIONS

Japanese Notification of Reason for Refusal issued in Japanese counterpart application No. 2016-537155 dated Mar. 28, 2017, with partial English translation (Eight (8) pages).
(Continued)

*Primary Examiner* — Stephan J Essex
(74) *Attorney, Agent, or Firm* — Crowell & Moring LLP

(57) ABSTRACT

A method for controlling the pressure on the cathode side of a fuel cell system is disclosed. The fuel cell system has at least one fuel cell, an air conveying device which is arranged on a common shaft with an expander, and a system bypass which connects the pressure-side outlet of the air delivery device to the pressure-side inlet of the expander via a system bypass line and a system bypass valve. The system bypass valve is opened in order to increase the pressure in the fuel cell.

3 Claims, 1 Drawing Sheet

(51) Int. Cl.
*H01M 8/04111* (2016.01)
*H01M 8/1018* (2016.01)
*H01M 8/04858* (2016.01)
*H01M 8/04119* (2016.01)

(52) U.S. Cl.
CPC ..... *H01M 8/04776* (2013.01); *H01M 8/1018* (2013.01); *H01M 8/0488* (2013.01); *H01M 8/04141* (2013.01); *H01M 2008/1095* (2013.01); *H01M 2250/20* (2013.01); *H01M 2300/0082* (2013.01); *Y02T 90/32* (2013.01)

(56) References Cited

U.S. PATENT DOCUMENTS

2004/0151964 A1 8/2004 Finger et al.
2010/0159360 A1* 6/2010 Stute ................. H01M 8/04111
429/513

FOREIGN PATENT DOCUMENTS

| DE | 10 2008 018 863 A1 | 10/2009 |
|---|---|---|
| JP | 61-80766 A | 4/1986 |
| JP | 2005-507136 A | 3/2005 |
| JP | 2005-228524 A | 8/2005 |
| JP | 2007-27149 A | 2/2007 |
| JP | 2008-293706 A | 12/2008 |
| JP | 2009-123550 A | 6/2009 |
| JP | 2013-501324 A | 1/2013 |
| WO | WO 02/086997 A2 | 10/2002 |
| WO | WO 2011/015282 A1 | 2/2011 |

OTHER PUBLICATIONS

PCT/EP2014/002275, International Search Report (PCT/ISA/220 and PCT/ISA/210) dated Nov. 20, 2014, with partial English translation, enclosing Written Opinion of the International Searching Authority (PCT/ISA/237) (Twelve (12) pages).

* cited by examiner

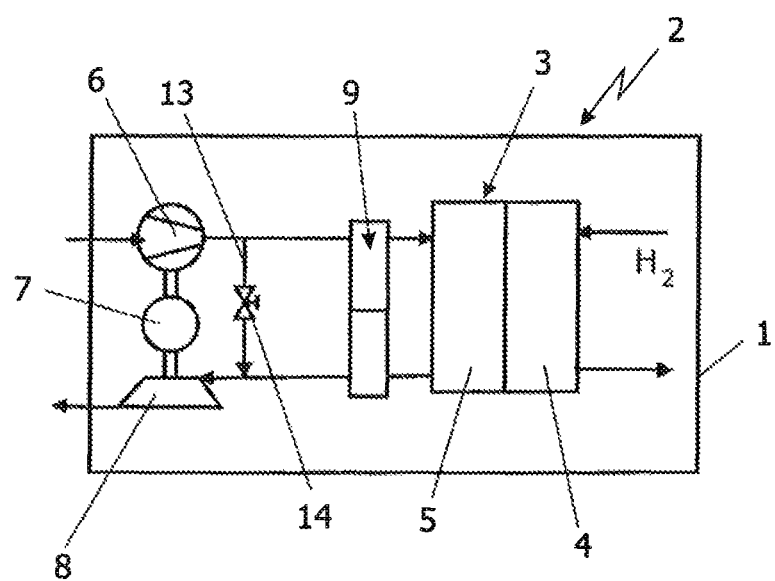

METHOD FOR CONTROLLING PRESSURE

BACKGROUND AND SUMMARY OF THE INVENTION

The invention relates to a method for controlling the pressure on the cathode side of a fuel cell system.

Fuel cell systems with air supply means are disclosed for example in DE 10 2007 028 297 A1, WO2011/015282 A1 or DE 10 2008 018 863 A1. In all three cases these involve flow compressors and an exhaust air turbine disposed on the same shaft. In one case an electric motor is additionally disposed on the shaft, in the other case the turbine and flow compressor are designed as freewheels and an additional electrically driven flow compressor is disposed in series therewith.

In all three cases a so-called reorientation valve or system bypass valve is described, which connects the compressor on the output side to the exhaust air turbine or the expander on the intake side, in order then in particular to blow off compressed air again immediately when there is a danger that the compressor is approaching its surge limit.

Furthermore in fuel cell systems, in an interaction between the quantity of air conveyed through the air conveying device and a counter-pressure which is built up by suitable means in the flow direction to the cathode of the fuel cell, a corresponding control of pressure takes place, in order for example in specific situations to adapt the pressure conditions in the fuel cell. Such control elements are known in principle from the prior art. When no turbine is used, such a control device is for example a pressure-sustaining valve. In particular when, as in the above-mentioned documents, turbines are used in the exhaust air of the fuel cell system, variable turbine guide baffles can be used as pressure control means in order to establish the desired or required counter-pressure. Such variable turbine guide baffles in each case in combination with a reorientation valve are disclosed for example in WO 02/086997 A2 and DE 102 16 953 A1.

In particular a variable turbine guide baffle is extremely expensive and increases the number of components required which are susceptible to faults. Furthermore, each component used in particular in the exhaust air section is at extreme risk of freezing if the temperatures fall below the freezing point after the stopping of the fuel cell system. Furthermore, such components are expensive and require installation space, which is only available to a very small extent in particular when used by fuel cell systems in vehicles.

The object of the present invention is to provide a method for controlling pressure, in particular for increasing pressure, on the cathode side of a fuel cell system which functions without its own pressure control element.

The method according to the invention for controlling the pressure on the cathode side of a fuel cell system provides that a system bypass, which is present in any case and which connects the pressure-side outlet of the air conveying device to the pressure-side inlet of the expander, is opened in order to increase the pressure. This method according to the invention has a surprising effect in the first instance, since a volume of air conveyed via the system bypass is blown off and does not flow through the cathode side. It might be expected here that the pressure therefore drops and is not increased as required. However, the inventors have found that by the opening of the system bypass, the quantity of air which flows via the system bypass directly into the delivery-side inlet of the expander is capable of appropriately increasing the counter-pressure in the region of the expander, typically an exhaust air turbine. This leads, as for example to the case of a variable turbine guide baffle which is closed, to a higher counter-pressure which, with an almost unchanged pressure drop in the further components of the cathode side of the fuel cell system, propagates through the entire system and thus leads to the required pressure increase on the cathode side, in particular in the fuel cell or the cathode compartment thereof. In this case the desired value of the air mass flow conveyed to the fuel cell in particular remains unchanged. Thus, due to the structure it is possible at least temporarily to control pressure very simply and efficiently, and in particular without discrete pressure control elements. This is advantageous in particular if a temporary pressure increase is required, for example in order to increase the fuel cell voltage or in order to influence the humidification of the fuel cell by means of the pressure level.

For this purpose the cross-section of the system bypass through which the flow can pass is changed as a function of the required pressure. Such fine control, or a combination with a corresponding pressure measurement and a feedback message for control of the system bypass valve, even an adjustment, enables a precise adaptation of the required pressure. As usual, such a changed flow cross-section in the system bypass can of course also be achieved by means of a mere open/close valve, which is controlled by pulse width modulation so that the corresponding through-flow cross-section is established over a time average.

As already mentioned, in the method according to the invention further pressure control elements on the cathode side are omitted completely, so that the Method can be implemented very simply, cost-effectively, easily and on a small scale. Moreover, it is significantly more reliable by comparison with designs which have pressure control elements on the cathode side, since the danger of a malfunction of such pressure control elements is completely eliminated, for example because at temperatures below freezing point they are immobilized by ice.

Further advantageous embodiments of the method according to the invention are disclosed by the rest of the dependent subordinate claims and the exemplary embodiment which is described in greater detail below with reference to the drawing.

BRIEF DESCRIPTION OF THE DRAWING

The single appended drawing shows a schematic diagram of a fuel cell system in a vehicle for carrying out the method according to the invention.

DETAILED DESCRIPTION OF THE DRAWING

The representation in the drawing indicates purely by way of example a vehicle 1 in which a fuel cell system 2 can be seen which should serve for providing electrical drive power. In this case only the components of the fuel cell system 2 which are relevant for explanation of the invention are shown. The core of the fuel cell system 2 is formed by a fuel cell 3, which is designed as a stack of PEM individual cells. Only one anode compartment 4 and one cathode compartment 5 of the fuel cell 3 is indicated purely by way of example. Hydrogen ($H_2$) is delivered to the anode compartment 4 and exhaust gas leaves this compartment. This structure has no further relevance for the invention, so that there is no further discussion of the anode side. However, the usual design of an anode side of a fuel cell system 2 is familiar to the person skilled in the art. It can be implemented for example as a so-called dead-end or near-dead-end structure with an anode recirculation.

Air is delivered to the cathode compartment 5 of the fuel cell 3 by means of an air conveying device 6, for example a flow compressor 6. The flow compressor 6, together with an electric motor 7 and an exhaust air turbine 8 as expander, is disposed on a common shaft. This structure is also designated as an electric turbocharger. Energy in the form of thermal energy and pressure energy can be recovered from the exhaust air by means of the exhaust air turbine 8. Thus the drive power to be applied by the electric motor 7 for the flow compressor 6 can be reduced. In specific operating situations it may also be the case that in the region of the exhaust air turbine 8 a greater power is present than is required by the flow compressor 6. The electric motor 7 can then also be operated as a generator in order to provide electrical power for consumer units and/or to store electrical power in an energy storage device (not shown here), for example a battery.

After the air conveying device 6 the inlet air enters the cathode compartment 5 of the fuel cell 3 via an indicated gas/gas humidifier 9. The exhaust air from the cathode compartment 5 of the fuel cell 3 also flows as a humidity supplier via the humidifier 9 and then enters the environment via the aforementioned exhaust air turbine 8 as expander. Moreover, the fuel cell system 2 has a so-called system bypass which consists of a system bypass line 13 with a system bypass valve 14. When the system is shut down and the system bypass valve 14 is open, this system bypass serves for example to minimize the inflow of air into the cathode compartment 5 so that, without valve devices which could potentially freeze, a reduced quantity of air can be obtained in the air supply duct 9 during shutdown in the cathode compartment, which when the system is restarted enables significant advantages with regard to the service life of the fuel cell 3. Moreover, by means of the system bypass valve 14 the flow compressor 6 can be prevented from reaching its surge limit. In this case the system bypass valve 14 could also be designated as a reorientation valve, as is the case in the prior art referred to in the introduction.

The fuel cell system 2 in the vehicle now has no pressure control elements, in order for example if required to increase the pressure in the fuel cell 3 on the cathode side. This could be required for example if the humidity of the inlet air flowing to the fuel cell 3 is to be influenced appropriately by means of the pressure, or in particular in the case where the air pressure in the cathode compartment 5 of the fuel cell 3 and thus the voltage of the fuel cell 3 are to be increased, in order to provide the required electrical power with little waste heat when limited cooling power of the vehicle is available. In these situations a pressure control element would then definitely be desirable. However, in other situations, for example when the temperature of the fuel cell system cools to temperatures below the freezing point, it also has crucial disadvantages, since then there is a danger of freezing. In order nevertheless to achieve the required pressure increase without having to use for example a variable turbine geometry or a pressure-sustaining valve or a throttle valve in the flow direction of the air to the cathode compartment 5, the system bypass valve 14 can be opened when the required pressure increase is reached. This takes place by freeing of a corresponding cross-section which is associated with the required pressure increase, for example by means of a characteristic field or the like. A specific control is also conceivable. In addition to a proportional valve, which enables a continuous increase and decrease of its cross-section, the use of an open/close valve which is controlled by pulse width modulation is also conceivable.

By the opening of the system bypass valve 14, more air which the air conveying device 6 has conveyed arrives directly in front of the exhaust air turbine 8 and thus also increases the counter-pressure in the exhaust air section without the need for a discrete pressure control element, so that the higher required pressure is established in the cathode compartment 5 of the fuel cell system. In this case the air mass flow which is conveyed by the air conveying device 6 to the fuel cell 3 or the cathode compartment 5 is kept at its previous desired value and is not increased. However, since the air mass flow must now be additionally conveyed through the system bypass valve 14 an increase in the rotational speed of the air conveying device 6 ensues. Thus ultimately, as already mentioned, the pressure buildup on the exhaust air turbine increases, whilst the pressure drop in the rest of the components of the cathode section, that is to say in the humidifier 9 and the cathode compartment 5, remains unchanged or virtually unchanged. Thus the pressure rises in the cathode compartment 5. The voltage of the fuel cell 3 is increased and the waste heat is correspondingly reduced, even if the fuel cell 3 has to be operated in order to supply the increased drive power for the air conveying device 6 with a somewhat higher load point. Thus a reduction in the electrical power of the fuel cell 3 can be prevented very simply and efficiently, if no sufficient cooling power is available on the vehicle 1 for removal of the waste heat produced.

The invention claimed is:

1. A method for controlling pressure on a cathode side of a fuel cell system having a fuel cell, an air conveying device which is disposed on a common shaft with an expander, and a system bypass which connects a pressure-side outlet of the air conveying device to a pressure-side inlet of the expander via a system bypass line and a system bypass valve, wherein the fuel cell system does not have a variable turbine guide baffle, comprising the steps of:

opening of the system bypass valve and increasing a pressure in the fuel cell by the opening of the system bypass valve, wherein by the opening of the system bypass valve a quantity of air which flows via the system bypass directly into the pressure-side inlet of the expander increases a counter-pressure in a region of the expander, without requiring the variable turbine guide baffle, which causes the increasing of the pressure in the fuel cell, and wherein during the opening of the system bypass valve a value of an air mass flow conveyed to the fuel cell remains unchanged; and changing a cross-section of the system bypass valve through which a flow passes as a function of a required pressure.

2. The method according to claim 1, wherein freeing of the cross-section which is associated with the required pressure takes place by a characteristic field.

3. The method according to claim 1, wherein the pressure increase reduces waste heat from the fuel cell at a same or a greater electrical power output of the fuel cell.

* * * * *